United States Patent Office

3,094,389
Patented June 18, 1963

3,094,389
PRODUCTION OF SILICON TETRACHLORIDE
Robert N. Secord, Wenham, and Charles B. Wendell, Canton, Mass., assignors to Cabot Corporation, Boston, Mass., a corporation of Delaware
No Drawing. Filed Dec. 15, 1959, Ser. No. 859,568
9 Claims. (Cl. 23—205)

This invention relates to silicon tetrachloride and in particular to a process for the production of silicon tetrachloride from sand in high yields.

It is the principal object of the present invention to provide an improved process for the production of silicon tetrachloride.

It is another object of the present invention to provide a process whereby silicon tetrachloride can be produced in good yields from sand.

It is another object of the present invention to provide a process whereby silicon tetrachloride can be produced by reacting unvaporized silica sand with carbon monoxide and chlorine in a flame.

Other objects will in part be obvious and will in part appear hereinafter.

In accordance with the present invention, silicon tetrachloride is produced in good yields by reacting silica sand with carbon monoxide and chlorine at temperatures above about 2200° F. in a flame or plasma torch. The advantages of the process of the present invention are many: In particular, unlike prior art processes, the present process utilizes relatively inexpensive raw materials, requires little external heat after initiation of the reaction, requires no pelleting or briqueting operation, and totally eliminates the usually formidable problem of containing a reaction involving chlorine at elevated temperatures.

In practicing the present invention, the finely-divided solid silica sand is entrained by any well-known procedure in a gaseous medium, preferably one or more of the gaseous reactants. The entrained silica together with he other reactants are then introduced into a suitable burner. The reaction is initiated in any suitable manner, for example, by introducing oxygen (or air) and carbon monoxide in excess of the amount necessary for the main reaction involving silica sand, chlorine and carbon monoxide into the burner. As soon as initiation of the reaction occurs (above about 2200° F.) silicon tetrachloride is produced in the flame in high yields.

The main reaction, $$SiO_2 + 2Cl_2 + 2CO \rightarrow 2CO_2 + SiCl_4$$

is substantially exothermic and accordingly, once initiated, is self-sustaining. However, if circumstances call for temperatures higher than those self-attainable in the particular apparatus utilized, such higher temperatures are readily attained by preheating one or more of the reactants prior to their introduction into the burner. For example, either the sand or the gaseous reactants or both can be preheated, but preferably the carbon monoxide and/or chlorine will be supplied in preheated form. Alternatively, the same result can be achieved by introducing into the burner, small amounts of oxygen (supplied as such or in the form of air) which on reaction therein with some of the carbon monoxide liberates additional heat. When oxygen is introduced into the burner, an amount of carbon monoxide at least slightly in excess of the amount stoichiometrically necessary for both the main reaction, $$SiO_2 + 2Cl_2 + 2CO \rightarrow SiCl_4 + 2CO_2$$

and for the reaction between carbon monoxide and oxygen $$2CO + O_2 \rightarrow 2CO_2$$

is continuously introduced into the burner in order to minimize the amount of unreacted oxygen which will be present in the product stream since free oxygen therein might react to form silicon oxychlorides which would contaminate the silicon tetrachloride product.

The quantity of the gaseous reactants, carbon monoxide and chlorine, utilized in the present invention is not critical. Since, however, the main reaction, $$SiO_2 + 2Cl_2 + 2CO \rightarrow SiCl_4 + 2CO_2$$

consumes carbon monoxide and chlorine in stoichiometrically equal amounts, carbon monoxide and chlorine are introduced into the reaction zone for the main reaction in about a 1:1 molar ratio, since an excess of either one over the other is largely wasted unless recovered, for example, by recycling. Accordingly, larger and larger excesses of one over the other become increasingly economically disadvantageous.

Any silica sand which comprises at least about 95% $SiO_2$ is suitable for the purposes of the present invention. Of course, if the sand is of even greater purity than 95% and particularly if the sand contains little or no iron, subsequent operations, such as separating ferric chloride from the silicon tetrachloride product, can be minimized or totally eliminated. Accordingly, sands containing at least 99% silicon dioxide are definitely preferred.

The particle size of the silica sand is somewhat critical. In general, the use of smaller particle size sands allows entrainment to be accomplished more readily and increases the reaction rate. Accordingly, extra fine silica sands, that is those having an average particle size of less than about 325 mesh, are definitely preferred. However, particle sizes up to about 100 mesh may be used if the velocity of the gaseous entrainment medium is sufficiently high.

No particular pretreatment of the sand prior to its use is necessary. However, the sand is preferably washed and thoroughly dried prior to use. The washing is desirable in order to remove loose impurities (including organic matter) and drying thereafter is important because the presence of appreciable quantities of moisture in the product stream causes loss of the silicon tetrachloride product due to hydrolysis.

Entrainment of fine silica particles can be accomplished in any of the gaseous reactants, e.g. carbon monoxide or chlorine (or oxygen or air, if utilized), or entrainment can be accomplished in any inert gaseous medium which is subsequently introduced into the burner. Preferably, however, the silica is entrained in one or more of the gaseous reagents since the use of an inert medium will tend to dilute the flame, absorb heat, and cause the desired reaction to proceed less readily.

In one embodiment of the invention, phosgene is utilized in place of a mixture of carbon monoxide and chlorine. The use of phosgene is advantageous in that the desired reactants (carbon monoxide and chlorine) are present in phosgene as an intimate mixture and in the preferred equimolar ratio desired for the main reaction. On the other hand, the use of phosgene is disadvantageous in that the reaction between phosgene and sand is less exothermic than the corresponding reaction involving sand, carbon monoxide and chlorine, and in the fact that phosgene, having a relatively low thermal capacity, cannot usually be sufficiently preheated to render the reaction thermally self-sustaining. Accordingly, when phosgene is utilized in place of a mixture of chlorine and carbon monoxide, an (additional) source of heat, such as the introduction into the burner of a mixture of exothermally reacting ingredients (e.g. oxygen and additional carbon monoxide), is generally required.

There follow a number of non-limiting illustrative examples:

*Example 1*

To a burner of the type in which the flame forms immediately upon mixing of the gases, which mixing does not occur until the gases exit from the burner, said burner having two feed ports, sized so that the gas velocities are about 1.0–1.5 ft./sec., are fed 56 lb./hr. of carbon monoxide and 32 lb./hr. of oxygen. As soon as the flame has been established (at temperature of about 4000° F.), the carbon monoxide flow is increased to 112 lb./hr., the oxygen flow is maintained at the same level and 60 lb./hr. finely-divided silica sand flour (−270 +325 mesh), suspended in the carbon monoxide flow by means of a gas transport powder feeder, and 142 lb./hr. chlorine, are also fed to the burner. The chlorine and oxygen flows are mixed by means of a gas mixing chamber and supplied to the second burner feed port at the above-specified velocity. A flame temperature of about 2600° F. results and silicon tetrachloride is formed at the rate of approximately 120 lb./hr. The silicon tetrachloride product is collected by means of a suitable condensing system.

*Example 2*

To a 106 kw. Plasma Jet (364,000 B.t.u./hr.) is fed 150 lb./hr. finely-divided silica sand flour, 1790 s.c.f.h. chlorine and 1790 s.c.f.h. carbon monoxide, the sand being suspended in the carbon monoxide stream by means of a gas transport powder feeder. The silicon tetrachloride product is collected by means of a suitable condensing system at the rate of about 300 lbs./hr. (approximately 71% yield).

*Example 3*

To a burner of the type described in Example 1, having two feed ports, sized so that the gas velocities are of the order of at least 1 to 1.5 ft./sec., are fed 56 lb./hr. of carbon monoxide and 32 lb./hr. of oxygen. As soon as the flame has been established (at temperature of about 4000° F.), and while the carbon monoxide and oxygen flow is maintained at the same levels, 60 lb./hr. finely-divided silica sand flour (−270 +325 mesh), and 198 lb./hr. phosgene are also fed to the burner, the sand being suspended in the phosgene stream by means of a gas transport powder feeder. The phosgene and oxygen flows are mixed by means of a gas mixing chamber and supplied to the second burner feed port at the above specified velocity. A flame temperature of about 2600° F. results and silicon tetrachloride is formed. The silicon tetrachloride product is collected by means of a suitable condensing system at a rate of about 120 lbs./hr.

Obviously many changes can be made in the above-described procedures without departing from the scope of the invention. Accordingly, it is intended that the above disclosure be regarded as illustrative and as in no way limiting the scope of the invention.

What we claim is:

1. A process for producing silicon tetrachloride at high yields which comprises reacting finely-divided silica sand entrained in a gaseous medium, said gaseous medium being one chosen from the group consisting of chlorine, carbon monoxide, phosgene, air, oxygen, inert gases, and mixtures of any of same, with a reactant chosen from the group consisting of a gaseous mixture of carbon monoxide and chlorine, and phosgene, in a flame at temperatures between about 2200° F. and about 2800° F.

2. The process of claim 1 wherein said reactant comprises a mixture of carbon monoxide and chlorine.

3. The process of claim 2 wherein oxygen is introduced into the reaction zone.

4. The process of claim 3 wherein said gaseous carbon monoxide is present in an amount at least slightly in excess of the combined amounts necessary (*a*) to establish a 1:1 molar ratio of carbon monoxide to chlorine and (*b*) to stoichiometrically react with all said oxygen introduced into the reaction zone.

5. A process for producing silicon tetrachloride at high yields which comprises establishing a flame having a temperature between about 2200° F. and about 2800° F., entraining finely-divided silica sand in a gaseous medium chosen from the group consisting of the carbon monoxide, chlorine, phosgene, air, oxygen, inert gases, and mixtures of any of same, and introducing said sand-bearing gaseous medium into said flame, and simultaneously introducing into said flame a gaseous reactant chosen from the group consisting of a mixture of carbon monoxide and chlorine, and phosgene.

6. The process of claim 5 wherein the flame is formed by burning carbon monoxide.

7. The process of claim 5 wherein the flame is a plasma jet.

8. The process of claim 5 wherein said gaseous reactant is an equimolar mixture of carbon monoxide and chlorine.

9. The process of claim 5 wherein said gaseous reactant is phosgene.

References Cited in the file of this patent

UNITED STATES PATENTS

| | | |
|---|---|---|
| 2,253,471 | Muskat et al. | Aug. 19, 1941 |
| 2,952,513 | Wigton | Sept. 13, 1960 |
| 3,010,793 | Secord | Nov. 28, 1961 |

OTHER REFERENCES

Lessing: "High Speed Chemistry," Sci. Amer., vol. 188, No. 5, May 1953, pages 29–35.

Mellor: A Comprehensive Treatise on Inorganic and Theoretical Chemistry, Longman, Green and Co., N.Y., vol. 6, 1925, pages 960 and 961.